United States Patent [19]

Niino et al.

[11] Patent Number: 4,703,620
[45] Date of Patent: Nov. 3, 1987

[54] ROCKET COMBUSTION CHAMBER COOLING WALL OF COMPOSITE COOLING TYPE AND METHOD OF MANUFACTURING THE SAME

[75] Inventors: Masayuki Niino, Sendái; Nobuyuki Yatsuyanagi, Shibata; Akiraga Kumakawa, Souma; Akio Suzuki, Shibata; Hiromi Gomi, Shibata; Hiroshi Sakamoto, Shibata; Masaki Sasaki, Shibata; Yoshimichi Masuda, Sendai; Ryuzo Watanabe, Sendai; Junjiro Takekawa, Sendai; Etsuo Ohtsuki, Sendai; Terashi Isago, Shibata, all of Japan

[73] Assignee: The Director of National Aerospace Laboratory of Science and Technology Agency, Shun Takeda, Tokyo, Japan

[21] Appl. No.: 18,790

[22] Filed: Feb. 24, 1987

Related U.S. Application Data

[63] Continuation of Ser. No. 780,248, Sep. 26, 1985, abandoned, which is a continuation of Ser. No. 686,618, Dec. 27, 1984, abandoned, which is a continuation of Ser. No. 499,841, Jun. 1, 1983, abandoned.

[30] Foreign Application Priority Data

Jun. 8, 1982 [JP] Japan .................................. 57-98356

[51] Int. Cl.⁴ ........................... F02K 9/40; F02K 9/42
[52] U.S. Cl. .......................................... 60/260; 419/5; 60/909
[58] Field of Search ................. 60/257, 260, 261, 909, 60/251; 419/5, 42; 416/97 A; 75/DIG. 1

[56] References Cited

U.S. PATENT DOCUMENTS 2,956,399 10/1960 Beighley ............................. 60/909
3,103,885 9/1963 McLauchlan ........................ 60/260
3,115,746 12/1963 Hsia ...................................... 60/909
3,153,320 10/1964 Prosser ................................. 60/909
3,460,759 8/1969 Gregory et al. ...................... 60/909
3,780,533 12/1973 Huang .................................. 60/260
3,802,849 4/1974 Kimura et al. .......................... 419/5
3,897,531 7/1975 Overhoff et al. ..................... 419/42
3,910,039 10/1975 Fortini .................................. 60/265
4,078,604 3/1978 Christl et al. ........................ 60/260
4,094,672 6/1978 Fleck et al. ........................... 419/42
4,268,765 5/1981 Hoover, Jr. .......................... 310/11
4,311,433 1/1982 Bratton et al. ...................... 416/974
4,314,399 2/1982 Severinsson ................... 75/DIG. 1
4,314,794 2/1982 Holden et al. ...................... 416/225

FOREIGN PATENT DOCUMENTS 959423 2/1957 Fed. Rep. of Germany .
1273907 7/1968 Fed. Rep. of Germany .
16758 8/1964 Japan ..................................... 419/5

OTHER PUBLICATIONS

Wagner, H. E., and Harman, C. G., "Hydrostatic Pressing as a Fabrication Technique", *Ceramic Bulletin*, vol. 30, #10, 1951, pp. 341-344.

Primary Examiner—Carlton R. Croyle
Assistant Examiner—Timothy S. Thorpe
Attorney, Agent, or Firm—Shapiro and Shapiro

[57] ABSTRACT

In the cooling wall of a regenerative cooling rocket combustion chamber, the throat portion thereof in which the heat load is highest is formed of a porous material having a perspiring cooling action. The other portion in which the heat load is relatively low is designed to be cooled by conventional forced convection. By such a composite cooling system, a high cooling effect is provided and yet the pressure loss in the cooling passages is small and light weight and long life of the engine are attained concurrently.

12 Claims, 6 Drawing Figures

ROCKET COMBUSTION CHAMBER COOLING WALL OF COMPOSITE COOLING TYPE AND METHOD OF MANUFACTURING THE SAME

This is a continuation application of Ser. No. 780,248 filed Sept. 26, 1985, which is a continuation application of Ser. No. 686,618 filed Dec. 27, 1984, which is a continuation application of Ser. No. 499,841 filed June 1, 1983, all of which are now abandoned.

TECHNICAL FIELD

This invention relates to the cooling wall structure of a rocket combustion chamber having a very high cooling ability and to a method of manufacturing the same.

BACKGROUND ART

When the combustion pressure of a liquid-propellant rocket engine is very high, it is no exaggeration to say that whether the cooling of the combustion chamber thereof is good or bad determines the performance and life of the engine. However, it is known that the conventional cooling system using forced convection is limited in its cooling ability. Particularly, in the reusable type high performance rocket engine, it is necessary to enhance the cooling ability in order to increase its life, but if an attempt is made to enhance the cooling ability by using the conventional system, it will lead to a greatly increased pressure loss in the cooling passages and an increased weight of the entire rocket engine, which in turn will result in reduced performance of the engine.

SUMMARY OF INVENTION

The foregoing problems are solved in accordance with the present invention which provides a cooling system wherein, in the cooling wall of a regenerative cooling rocket combustion chamber, the throat portion in which the heat load is highest is formed of a porous material and thus cooled by a perspiring cooling system having a cooling ability much higher than that of forced convection, and the other portion in which the heat load is relatively low is cooled by conventional forced convection, whereby the cooling system has a high cooling effect and yet has from a small pressure loss in the cooling passages and concurrently attains the advantages of a light weight and long life of the engine.

The present invention also provides a method of manufacturing the cooling wall of a rocket engine combustion chamber as described above, which comprises steps of filling up a portion of the space between a core having the same outer configuration as the inner configuration of the combustion chamber and a pressure bag which corresponds to the throat portion of the combustion chamber with metallurgy powder of coarse particle size and filling up the other portion of the space with metallurgy powder of fine particle size; pressure-molding the powder of coarse particle size and the powder of fine particle size; and integrally sintering the molded body of the pressure-molded powders.

DESCRIPTION OF THE PREFERRED EMBODIMENT

Figure 1:
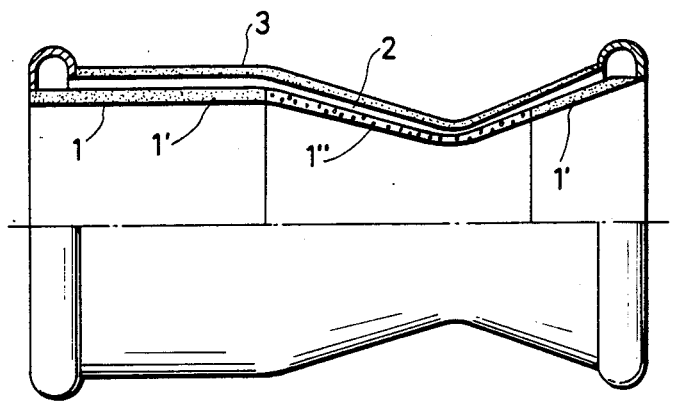
FIG. 1 is a side view, partly in cross-section, of the composite cooling type rocket combustion chamber of the present invention.
Figure 2:
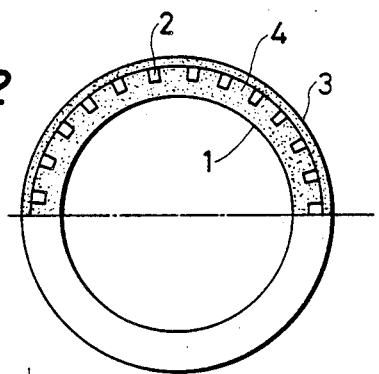
FIG. 2 is a vertical cross-sectional view of the rocket combustion chamber of FIG. 1.

Referring to FIG. 1, a cross-section of a part of the composite cooling type rocket combustion chamber of the present invention is shown as a side view. FIG. 2 is a vertical cross-sectional view thereof. In these figures, reference numeral 1 designates a cooling wall having therein grooves 2 which provide coolant passages, and reference numeral 3 denotes an outer cylinder or tube. The cooling wall 1 is comprised of a portion 1' formed of a high heat conductive non-porous material such as copper and a perspiring portion 1" formed of a porous material. The perspiring portion 1" is the throat portion of the combustion chamber.

A coolant of liquid fuel is flowed over the outer surface of wall 1 in the grooves 2. The coolant leaches from the grooves 2 through the porous material of the perspiring portion 1" into the inner surface of the combustion chamber and will gasify cooling by virtue of the gasification latent heat and preventing hot combustion gases from directly contacting the inner throat wall 1. Therefore heat load in this portion will be decreased to the order of oneseveral tenth to one-hundredth of that in the cooling system according to the prior art.

On the other hand, the portion 1' other than the throat portion is cooled by conventional forced convection and therefore, where the rocket engine adopts a fuel supply system such as a two-stage combustion cycle or an expander cycle, it becomes possible to impart a necessary quantity of heat to the coolant by adjusting the heat-receiving area. That is, the rocket combustion chamber of the present invention can be said to have both the merit of perspiration cooling and the merit of forced convection cooling.

The cooling wall 1 partly having different natures can be integrally manufactured in the following manner.

Figure 3:
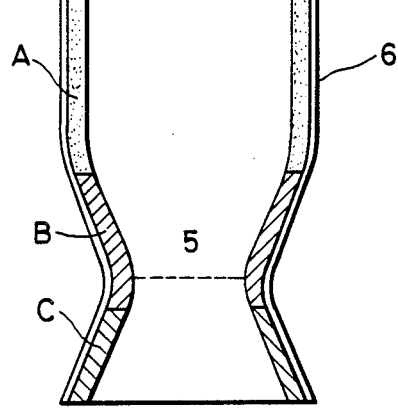
FIG. 3 is a view to illustrate a method of manufacturing the cooling wall of the composite cooling type rocket combustion chamber of the present invention.

As shown in FIG. 3, the portion C of the space between a core 5 having the same outer configuration as the inner configuration of the combustion chamber and a pressure bag 6 is filled up with electrolytic copper powder of very fine particle size, say, of the order of 150-400 meshes, the portion B of the space corresponding to the perspiring portion 1" is filled up with electrolytic copper powder of coarse particle size, and the portion A of the space is filled up with electrolytic copper powder of 150-400 meshes. This assembly is pressure-molded, such as by a hydrostatic pressure method, whereafter the core is removed, and the remainder is sintered to thereby obtain the cooling wall 1.

The particle size of the copper powder filling up the portion B which is the perspiring portion 1" is variable by the design of the combustion chamber and in some cases, metal fiber may be mixed with the copper powder to increase the strength thereof.

Figure 4:
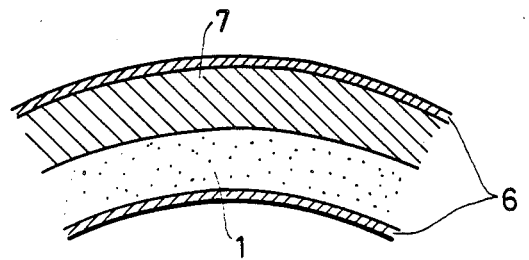
FIGS. 4-6 illustrate the manufacturing process for making the cooling wall of the composite cooling type rocket combustion chamber of the present invention into a grooved structure.
Figure 5:
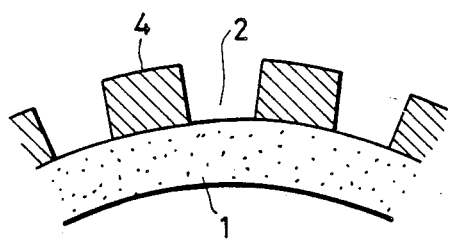

This cooling wall 1 is finished into a predetermined configuration, whereafter to form groove partition walls 4, the entire space between the cooling wall 1 and a second pressure bag 6' is filled up with copper powder of 150-400 meshes, as shown in FIG. 4, and then the cooling wall is pressure-molded and sintered. The outer layer 7 of the cooling wall thus obtained is then formed with grooves 2 of a depth slightly cutting into the cooling wall 1, as shown in FIG. 5, whereafter the inner and outer surfaces of the perspiring portion 1" are etched to expose the porous surface.

Figure 6:
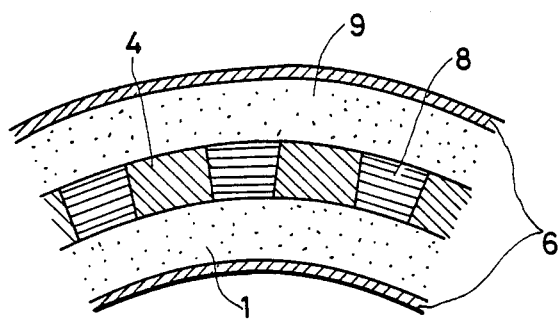

Subsequently, as shown in FIG. 6, the grooves 2 are filled up with a filler 8 such as paraffin wax, whereafter the space between the outer layer of the cooling wall and a third pressure bag 6" is filled up with fine copper powder 9 to form the outer cylinder 3, and then the cooling wall is pressure-molded and sintered in the same manner as previously described. During this sintering process, the paraffin wax filling the grooves evaporates and there is obtained a combustion chamber in which the groove partition walls 4 are rigidly joined with the outer cylinder 3 made of the powder 9.

The method of manufacturing the cooling wall 1 is not restricted to the above-described embodiment, but the high heat conductive portion 1' may be made of copper or a copper alloy by conventional machining, and this may be installed at a predetermined position on a core having the same outer configuration as the inner configuration of the combustion chamber, and only the throat portion B may be formed by the powder metallurgy. Alternatively, the separately molded perspiring portion 1" may be joined with the high heat conductive portion 1', whereafter groove partition walls may be formed in the same manner as described above and then the outer cylinder may be coated. Thus, the cooling wall may be manufactured by one of various manufacturing methods.

Also, a manufacturing method using chiefly copper as the porous material of the perspiring portion 1" has been described in detail hereinbefore. However, since copper itself is a material of relatively low melting point, the amount of perspiration required for protecting the cooling wall is relatively great. If this amount of perspiration is too great, it may hurt the performance of the engine. Therefore, if a metal of high melting point or ceramics is chiefly used as the material forming the perspiring portion 1" although this is technically of more or less higher degree, the amount of perspiration will be greatly reduced. Such material of high melting point usually is very hard and difficult to machine. However, where the powder metallurgy according to the present invention is resorted to, there is an advantage that such difficulty does not occur at all.

We claim:

1. A cooling system for a rocket engine combustion chamber defined by the inner surface of a cooling wall having a throat portion and a remaining portion, characterized in that said throat portion is made of a porous material and said remaining portion is made of a heat-conductive and non-porous material, in that said throat portion and said remaining portion are integrally formed by a hydrostatic pressure sintering process, in that said throat portion is a sinter of powder of coarse particle size and said remaining portion is a sinter of powder of fine particle size integral with the first-mentioned sinter, and in that said cooling wall has means for directing a coolant stream of liquid fuel over the outer surface of said throat and remaining portions of said cooling wall for causing the throat portion of said cooling wall to be cooled through perspiring action of liquid fuel from said stream passing through said porous material and the remaining portion of said cooling wall to be cooled through forced convection action of liquid fuel from said stream flowing over said heat-conductive and nonporous material of said remaining portion.

2. A cooling system according to claim 1, wherein said sinter of said throat portion is formed of electrolytic copper powder.

3. A cooling system according to claim 1, wherein said sinter of said throat portion contains metal fiber.

4. A cooling system according to claim 1, wherein said sinter of said throat portion is formed of high melting point material powder.

5. A cooling system according to claim 4, wherein said sinter of said throat portion is ceramic.

6. A cooling system according to claim 1, wherein said directing means comprise grooves formed in the outer surface of said cooling wall and an outer tube surrounding said outer surface of said cooling wall.

7. A cooling system according to claim 6, wherein said tube surrounding said outer surface of said cooling wall is a hydrostatic pressure-molded sinter rigidly attached by the pressure molding to walls of said grooves.

8. A cooling system according to claim 7, wherein each of said sinters is composed of electrolytic copper powder.

9. A method of manufacturing a cooling system for a rocket engine combustion chamber defined by the inner surface of a cooling wall, said cooling wall having a throat portion and a remaining portion, the throat portion being composed of a porous material and the remaining portion of a heat-conductive and nonporous material, said method comprising:
   providing a space of predetermined thickness between a core having the same outer configuration as the inner configuration of said combustion chamber and a pressure bag;
   filling up a portion of said space, which corresponds to the throat portion of the cooling wall, with metallurgy powder of coarse particle size and the remaining portion of said space with metallurgy powder of fine particle size;
   hydrostatically pressure-molding said powder of coarse particle size and said powder of fine particle size together; and
   integrally sintering the molded body of said pressure-molded powders so as to produce said throat portion of porous material sintered from said powder of coarse particle size and to produce said remaining portion of non-porous material sintered from said powder of fine particle size.

10. A method in accordance with claim 9, further comprising surrounding said cooling wall with a pressure bag spaced therefrom;
   filling up the space between the cooling wall and the last-mentioned pressure bag with metallurgy powder;
   hydrostatically pressure-molding the last-mentioned powder and sintering the same to form an outer layer of the cooling wall;
   forming a plurality of longitudinal, circumferentially spaced grooves in the cooling wall including said layer;
   filling the grooves with a meltable filler;
   surrounding the outer layer of the cooling wall with a pressure bag spaced therefrom;
   filling the space between said outer layer and the last-mentioned pressure bag with metallurgy powder; and
   hydrostatically pressure-molding and sintering the last-mentioned powder to form a sinter surrounding and rigidly joined with walls of said grooves, while melting said filler to open said grooves.

11. A method in accordance with claim 10, wherein after said grooves are formed, surfaces of said grooves at said throat portion are etched to provide exposed porous surfaces.

12. A cooling wall produced in accordance with the method of claim 9.

* * * * *